United States Patent [19]

Verheyen

[11] Patent Number: 5,187,701
[45] Date of Patent: Feb. 16, 1993

[54] DISC-RECORD PLAYER HAVING A LOADING DEVICE WITH A MOVABLE SUB-FRAME

[75] Inventor: Jozef H. M. R. Verheyen, Hasselt, Belgium

[73] Assignee: U.S. Philips Corporation, New York, N.Y.

[21] Appl. No.: 521,217

[22] Filed: May 8, 1990

[30] Foreign Application Priority Data

May 11, 1989 [NL] Netherlands .......................... 8901186

[51] Int. Cl.$^5$ .............................................. G11B 33/02
[52] U.S. Cl. .................................... 369/75.2; 369/77.1
[58] Field of Search ...................... 369/75.2, 77.1, 77.2; 360/99.02, 99.03, 99.06, 99.07

[56] References Cited

U.S. PATENT DOCUMENTS

| | | | |
|---|---|---|---|
| 4,607,361 | 8/1986 | Schultmaker et al. | 369/77.1 X |
| 4,614,988 | 9/1986 | Mahnke | 369/77.1 X |
| 4,779,257 | 10/1988 | Matsumoto | 369/75.2 |
| 4,797,869 | 1/1989 | Hirano | 369/75.2 |
| 4,799,209 | 1/1989 | Grobben | 369/75.2 |
| 4,825,429 | 4/1989 | Matsumoto | 369/75.2 |
| 4,829,501 | 5/1989 | Seto et al. | 369/75.2 |
| 4,979,161 | 12/1990 | Verhagen | 369/77.2 |

Primary Examiner—Eugene R. LaRoche
Assistant Examiner—Christopher R. Glembocki
Attorney, Agent, or Firm—David R. Treacy

[57] ABSTRACT

A disc-record player including a device for inscribing and/or reading information on a disc, a loading device for loading a disc into the player, and a disc-pressure device. The loading device includes a frame, a sub-frame and a drawer which is movable in inward and outward directions and has a supporting surface for a disc. The sub-frame carries a turntable, and is movable relative to the frame between rest and operating positions. Elements of a first type having inclined guide surfaces, and elements of a second type engaging the first type elements, guide movement of the sub-frame between the rest and operating positions. Elements of one of these types are arranged on the frame, and the elements of the other type are arranged on the sub-frame. Coupling elements couple the drawer to the sub-frame during a portion of the drawer movement in the inward and outward direction, for moving the sub-frame between its rest and operating positions.

17 Claims, 2 Drawing Sheets

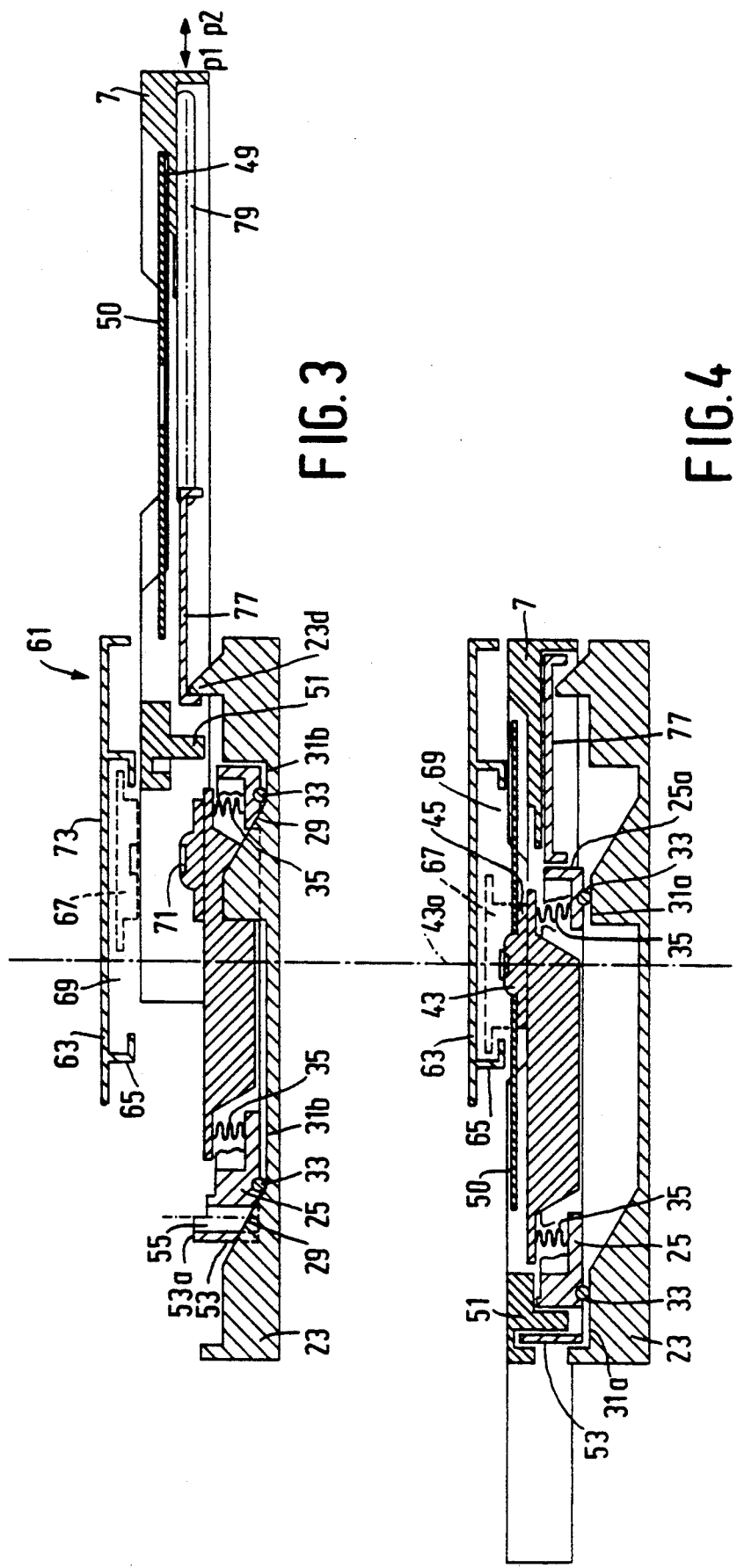

DISC-RECORD PLAYER HAVING A LOADING DEVICE WITH A MOVABLE SUB-FRAME

The present invention relates to a disc-record player comprising a device for inscribing and/or reading an information carrier, in particular an optical or magneto-optical disc record, wherein the device includes a scanning unit, a loading device for loading an information carrier into the player, and a disc-pressure device. The loading device includes a drawer, a frame and a sub-frame movable in the frame and relative to the frame between a rest position and an operating position. The sub-frame carries a turntable having an axis of rotation. The drawer is movable in an inward direction and an outward direction and has at least one supporting surface for an information carrier. The loading device further comprises elements of a first type having inclined guide surfaces and elements of a second type, the elements of the two types being adapted to cooperate with each other to move the sub-frame between the rest position and the operating position, elements of one type being arranged on the sub-frame.

The invention further relates to a loading device for loading an information carrier into the player, which loading device comprises a frame, a sub-frame which is movable relative to the frame between a rest position and an operating position and which carries a turntable having an axis of rotation, and a drawer which is movable in an inward direction and an outward direction and which has at least one supporting surface for an information carrier. The loading device further comprises elements of a first type having inclined guide surfaces and elements of a second type adapted to cooperate with the elements of the first type to move the sub-frame between the rest position and the operating position.

A disc-record player and a loading device of the type generally described above are known from German Offenlegungsschrift 37 07 846, to which U.S. Pat. No. 4,779,257 corresponds. This conventional horizontally arranged disc-record player comprises a frame which carries a loading device and a turntable. This loading device comprises a drawer with a gear rack, a frame having two side plates, a sub-frame having two laterally projecting pins, and a command member comprising two movable command plates. The pins of the sub-frame, which sub-frame is movable in a vertical direction only, engage vertical grooves in the side surfaces of the frame and grooves which are formed in the command plates of the command member and which are downwardly inclined viewed in the inward direction of movement the drawer, and the command plates are movable in the same direction of movement as the drawer. The loading device further includes a command plate driving rod, which can be coupled to the gear rack of the drawer via a transmission mechanism in order to move the command plates.

Due to the presence of a loading device including a large number of parts which are movable relative to each other, the known disc-record player constitutes a rather intricate mechanical assembly. In order to guarantee a correct sequence of the movements and a correct positioning of the supporting surface of the drawer stringent requirements have to be imposed on the mechanisms, which of course forces a rise in cost of the loading device and, hence, of any disc-record player using such a loading device.

SUMMARY OF THE INVENTION

It is an object of the invention to provide a disc-record player of the foregoing type that is of simple construction in order to minimize the number of parts and assembly operations required during its manufacture.

To this end the disc-record player in accordance with the invention constitutes elements of which one of the types are arranged on a frame and a sub-frame is adapted to be directly engaged by the drawer to move the sub-frame at least from its rest position to its operating position.

The disc-record player in accordance with the invention has the advantage that it employs a loading device which can be manufactured from a comparatively small number of simple parts which are also of compact dimensions. The simplified mechanical construction results in a reliable loading device and ensures a correct sequence of the functions to be performed between the interval at which an information carrier is loaded onto the drawer and the relevant information carrier cooperates with the write and/or read apparatus. Since the drawer of the loading device employed in the disc-record player in accordance with the invention can be of compact construction, the housing of the player requires only a comparatively small front opening for the inward and outward movements of the drawer, which advantageously provides more front panel area for the arrangement of controls and displays on the front of the player.

A simple-to-realize loading device is obtained in the disc-record player in accordance with the invention, wherein the drawer includes at least one actuating member and the sub-frame has at least one follower member, so that both members cooperate with each other at least during a portion of a drawer movement in its directions of travel.

An illustrative embodiment, in which the actuating member and the follower member cooperate with each other at least during a part of the drawer movements in the back and forth directions of travel, is characterized in that the actuating member and the follower member are constructed as coupling members, one of the coupling members being formed with an opening and the other coupling member comprising a pin which is engageable in said opening and which is oriented transversely of the supporting surface of the drawer.

Another illustrative embodiment of the disc-record player in accordance with the invention is characterized in that the elements of the first type are arranged on and fixed directly with respect to the frame and the elements of the second type are arranged on and fixed directly with respect to the sub-frame. In a relation to a horizontal arrangement, this illustrative embodiment is preferably characterized further in that the guide surfaces of the elements of the first type are upwardly inclined relative to the inward direction of movement of the drawer while the elements of the second type are cam-shaped or disc-shaped.

Preferably the disc-record player in accordance with the invention is dimensioned in such a way that during those parts of the drawer movements during which the actuating member and the follower member cooperate with one another, the information carrier, which is moved towards or away from the turntable, and the turntable, are situated coaxially above one another, the turntable being moved relative to the information carrier along its axis of rotation.

A practical embodiment of the disc-record player in accordance with the invention, in which the guide surfaces of the elements of the first type are formed by slots, is characterized in that the slots are formed in frame portions which are oriented in the inward and outward directions of the drawer and in directions parallel to the axis of rotation of the turntable.

A further embodiment of the disc-record player in accordance with the invention, in which an elongate opening is formed in the supporting surface of the drawer, is characterized in that at the location of the elongate opening the drawer is provided with a panel which extends parallel to the supporting surface and which is movably supported in the drawer. Such an opening may be necessary for the purpose of scanning the information carrier. The panel which is movable in the same directions of movement as the drawer makes the elongate 2 opening smaller in the slid-out position of the drawer, which is advantageous when inserting the information carrier, in particular a Compact Disc or a CD-single. In order to ensure that an opening of adequate size is available in the slid-in position of the drawer, the sub-frame may provide a stop for the panel.

It is another object of the invention to provide a loading device for use in a disc-record player in accordance with the invention.

BRIEF DESCRIPTION OF THE DRAWING

The invention will now be described in more detail, by way of example, with reference to the drawings, in which FIG. 3 is a longitudinal sectional view of the loading device shown diagrammatically in FIG. 2, the drawer being shown in the extended slid-out position, and FIG. 4 shows the diagrammatic view of FIG. 3, the drawer now being in the slid-in position.

DETAILED DESCRIPTION OF A PREFERRED EMBODIMENT

Figure 1:
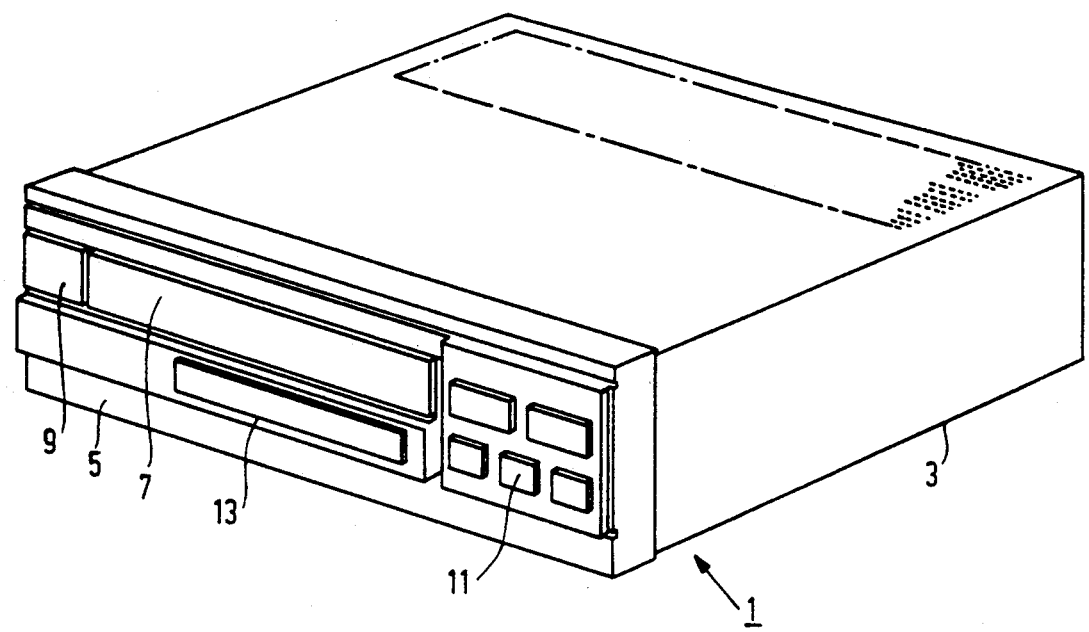
FIG. 1 is a perspective view of an optical disc record player in accordance with the invention.

The optical disc-record player shown in FIG. 1 may be a player intended for optically scanning audio, data and/or video discs, such as CD, CDI, CDROM, CDV and VLP. The player, generally indicated by the reference numeral 1, comprises a housing 3 having a front side 5 formed with a front opening in which a drawer 7 is arranged. Moreover, actuating keys 9, program keys 11 and a display 13 are situated on the front side 5. The housing accommodates a loading device, to which the drawer 7 belongs, and a device for optically scanning an optical disc. The last-mentioned device may be of a type as disclosed in U.S. Pat. No. 4,679,185 (herewith incorporated by reference), or in Netherlands Patent Application filed under No. 8800373.

Figure 2:
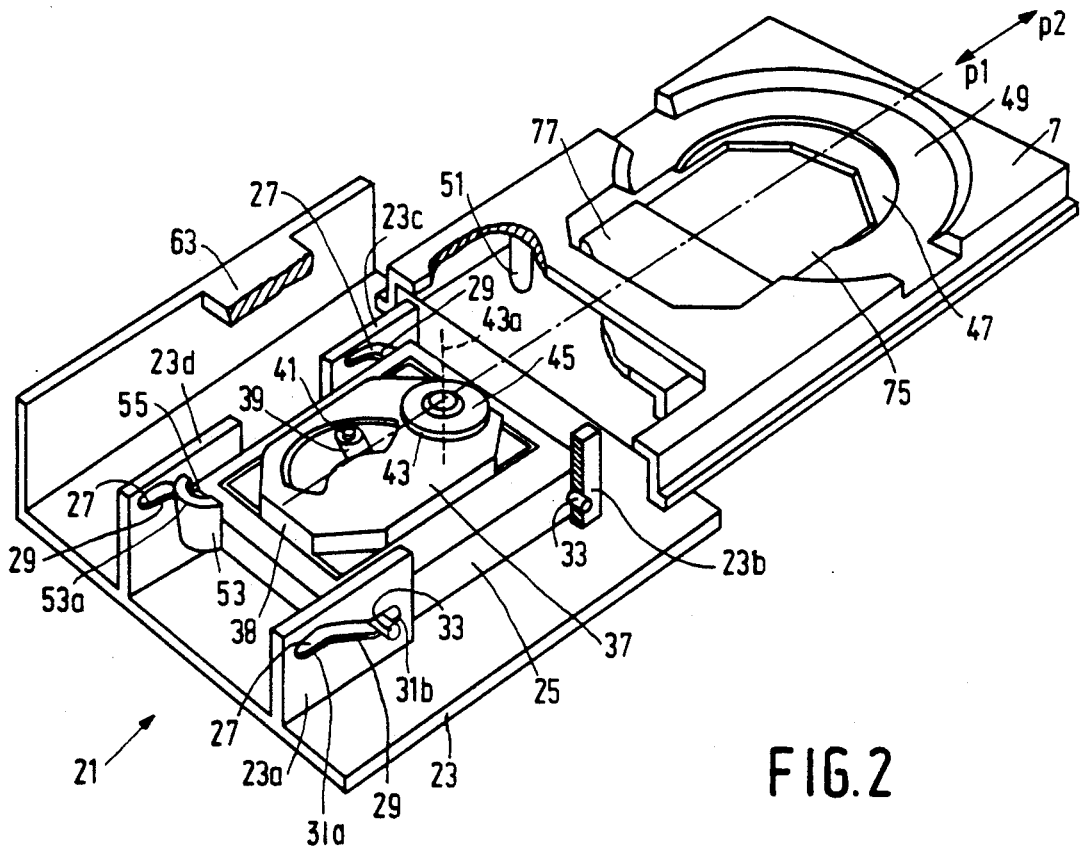
FIG. 2 is a perspective view of a part of the loading device in accordance with the invention having a drawer.

The loading device designated by the reference numeral 21 in FIGS. 2, 3 and 4 is highly suitable for use in a disc-record player of the type shown in FIG. 1. The loading device 21 includes a frame 23, a sub-frame 25 supported in the frame 23, and a drawer 7. The frame 23 can be fixedly mounted in the housing 3 of the disc-record player 1 shown in FIG. 1 and comprises four plate-shaped frame portions 23a, 23b, 23c and 23d in which slots 27 are formed. Since the frame portions 23a to 23d are formed with the slots 27 these portions each have an inclined guide surface 29, which in the illustrative embodiment shown adjoins a horizontal guide surface 31a and 31b respectively at opposite ends. In FIGS. 3 and 4 only the lower portion of frame 23 is shown, including the lower surfaces of the slots 27.

The sub-frame 25 comprises four laterally extending projections 33 such as rollers, or pins, which engage in the slots 27 in the frame portions 23a to 23d to cooperate with the guide surfaces 29, 31a and 31b. A device 37 for optically scanning an optical disc is arranged in the rectangular sub-frame 25 by means of resilient and damping suspension elements 35 (illustrative in FIGS. 3 and 4). The device 37 comprises a pivotal arm 39 carrying an optical scanning unit 41 and also comprises a turntable 43, which is rotatable about an axis of rotation 43a and has a supporting surface 45 for an optical disc. The device 37 comprises a mounting plate 38 in which the turntable 43 is supported at some distance above the mounting plate.

The drawer 7 is supported in the frame 23 in a manner known per se and can perform a rectilinear movement as indicated by the arrow p1 in FIG. 2 to transfer an optical disc to the turntable 43. Moreover, the drawer 7 can perform a rectilinear movement as indicated by the arrow p2 to remove an optical disc from the turntable. The drawer 7 has two supporting surfaces 47 and 49 for supporting a CD single and a CD respectively.

The drawer 7 and the sub-frame 25 can be coupled to each other by means of a pin-shaped actuating member 51, which is secured to the drawer 7, and a follower member 53, which is secured to the sub-frame and has an opening 55 in which the actuating member 51 is engageable.

In the position illustrated in FIGS. 2 and 3, the drawer 7 is extended to a slid-out position and an optical information carrier can be placed on one of the supporting surfaces 47 or 49. In FIG. 3, for example, an optical disc 50, a Compact Disc, is situated on the supporting surface 49. From the slid-out position the drawer can be moved into a slid-in position illustrated in FIG. 4 in the inward direction as indicated by the arrow p1 by hand or by means of an electric motor unit. At a predetermined instant during the rectilinear inward movement, the actuating member 51 of the drawer contacts a stop edge 53a of the follower member 53 of the sub-frame 25, after which the sub-frame 25 is moved in the direction indicated by the arrow p1. As the rectilinear inward movement of the drawer 7 proceeds, the projections 33 of the sub-frame 25 slide or roll along the inclined guide surfaces 29 of the frame. The slope of these guide surfaces causes the sub-frame to also perform a movement parallel to the axis of rotation 43a of the turntable 43. The last-mentioned movement is performed between the position of the sub-frame 25 shown in FIGS. 2 and 3, hereinafter referred to as the rest position, and the position shown in FIG. 4, referred as the operating position.

In the rest position of the sub-frame 25, the turntable 43 occupies such a position that the information carrier situated on the moving drawer 7 passes above the turntable 43 at some distance. After the actuating member 51 of drawer 7 has come into contact with the follower member 53 of sub-frame 25 during the inward movement, the sub-frame 25 and hence the turntable 43 will move relative to the drawer 7 exactly in a direction parallel to the axis of rotation 43a of the turntable 43.

The mechanism is dimensioned in such a way that at the instant at which the actuating member 51 contacts the stop edge 53a of the follower member 53, the information carrier situated on the drawer 7 is disposed centrally or at least substantially centrally above the turntable 43. In the operating position of the sub-frame 25, the turntable 43 has moved so far along its axis of rotation 43a that the information carrier 50, which has been moved inwards by means of the drawer 7, is situated on the supporting surface 45 of the turntable 43 and is disposed at some distance from the drawer 7 (see FIG. 4). In the operating position of the sub-frame 25, the projections 33 of the sub-frame are situated on the horizontal guide surfaces 31a of the frame 23 and the drawer 7 is in its slid-in position. The turntable 43 is then in its playing position, which means that the information carrier has been brought into its scanning position. Generally, a disc-pressure device is employed in order to guarantee that the information carrier remains on the turntable 43 during scanning.

FIGS. 3 and 4 show diagrammatically a suitable disc-pressure device. The disc-pressure device, bearing the reference numeral 61, comprises a member 63, arranged on the frame 23, with a holder 65 and a pressure means 67. The pressure means projects through a slot 69 in the holder 65, which slot has a longitudinal axis which is oriented as indicated by the arrows $p^1$ and $p^2$. The pressure means 67 is movable to a limited extent in the slot. In the operating position of the sub-frame 25, which corresponds to the play position of the turntable 43, the pressure means 67 urges the information carrier 50, which is situated on the turntable 43, against the supporting surface 45, the desired clamping force being provided by a magnetic attraction force produced by a first magnetic pressure element 71 arranged in the turntable 43 and a second magnetic pressure element 73 arranged in the pressure means 67.

In order to remove an information carrier from the turntable 43 the drawer 7 is moved in the direction indicated by the arrow $p^2$. As a result of the coupling between the drawer 7 and the sub-frame 25, the sub-frame is initially moved in the direction $p^2$ until the actuating member 51 has left the opening 55 in the follower member 53 because of the downward movement of the sub-frame. In this situation, the projections 33 engage with the horizontal guide surfaces 31b and the sub-frame is consequently in its rest position.

Since an information carrier which is situated on the turntable is scanned when the drawer 7 is in its fully slid-in position, this drawer is formed with a comparatively large elongated aperture 75 (see in particular FIG. 2) for the passage of a scanning beam. In order to enable a small optical information carrier, for example a CD single, to be conveniently placed onto the supporting surface 47 in the slid-out position of the drawer 7, the drawer comprises a panel or slide panel 77 which reduces the size of the opening 75. The slide panel 77 is supported so as to be rectilinearly movable in directions $p^1$ and $p^2$ in grooves 79 (see FIG. 3) in the drawer 7. In the slid-out position of the drawer 7, an edge portion 23d of the frame 23 constitutes a stop for the slide panel 77 and in the slid-in position of the drawer a wall portion 25a of the sub-frame 25 constitutes the stop for the slide panel 77.

It is to be noted that the invention is not limited to the illustrative embodiment described herein. Within the scope of the invention, other embodiments are possible, for example the device for scanning an information carrier may comprise a scanning unit arranged on a rectilinearly movable slide instead of a scanning unit arranged on a pivotal arm. Moreover, a drawer comprising more than two supporting surfaces may be employed.

I claim:
1. A disc-record player comprising
   a device comprising a scanning unit, for inscribing and/or reading an information carrier disc,
   a loading device, for loading an information carrier into the player, comprising a frame; a sub-frame movable in and relative to the frame between a rest position and an operating position; a turntable carried on the sub-frame and having an axis of rotation; a drawer which is movable relative to said frame in an inward direction and an outward direction and which has at least one supporting surface for an information carrier disc; elements of a first type having inclined guide surfaces; and elements of a second type, the elements of the two types being adapted to cooperate with each other to guide the sub-frame in movement between the rest position and the operating position, the elements of one type being arranged on and fixed directly with respect to the sub-frame; and
   a disc-pressure device for engaging a disc which has been loaded into said turntable and moved into the operating position,
   the elements of the other of said types being arranged on and fixed directly with respect to the frame, and the sub-frame being directly engaged by the drawer to move the sub-frame at least from its rest position to its operating position.

2. A disc-record player as claimed in claim 1, wherein the elements of the first type are arranged on the frame and the elements of the second type are arranged on the sub-frame.

3. A disc-record player as claimed in claim 2, wherein the player is arranged horizontally, and the guide surfaces of the elements of the first type are upwardly inclined relative to the inward direction of movement of the drawer, and the elements of the second type are pin-shaped.

4. A disc-record player as claimed in claim 3, wherein an elongated opening is formed in the supporting surface of the drawer, and at the location of the elongated opening, the drawer is provided with a panel which extends parallel to the supporting surface and is movably supported in the drawer.

5. A disc-record player as claimed in claim 3, in which the guide surfaces of the elements of the first type are formed by slots having walls, and the slots are formed in frame portions which extend parallel to the axis of rotation and the direction of drawer movement, one wall of each of said slots being a respective inclined surface for moving said sub-frame toward said disc-pressure device during movement toward the operating position.

6. A disc-record player as claimed in claim 2, wherein an elongated opening is formed in the supporting surface of the drawer, and at the location of the elongated opening, the drawer is provided with a panel which extends parallel to the supporting surface and is movably supported in the drawer.

7. A disc-record player as claimed in claim 2, in which the guide surfaces of the elements of the first type are formed by slots having walls, and the slots are formed in frame portions which extend parallel to the axis of rotation and the direction of drawer movement, one wall of each of said slots being a respective inclined surface for moving said sub-frame toward said disc-pressure device during movement toward the operating position.

8. A disc-record player as claimed in claim 7, wherein an elongated opening is formed in the supporting surface of the drawer, and at the location of the elongated opening, the drawer is provided with a panel which extends parallel to the supporting surface and is movably supported in the drawer.

9. A disc-record player as claimed in claim 1, wherein an elongated opening is formed in the supporting surface of the drawer, and at the location of the elongated opening, the drawer is provided with a panel which extends parallel to the supporting surface and is movably supported in the drawer.

10. A disc-record player as claimed in claim 9, wherein the sub-frame comprises a stop for the panel of the drawer.

11. A disc-record player comprising
  a device comprising a scanning unit, for inscribing and/or reading an information carrier disc,
  a loading device, for loading an information carrier into the player, comprising a frame; a sub-frame movable in and relative to the frame between a rest position and an operating position; a turntable carried on the sub-frame and having an axis of rotation; a drawer which is movable relative to said frame in an inward direction and an outward direction and which has at least one supporting surface for an information carrier disc; elements of a first type having inclined guide surfaces; and elements of a second type, the elements of the two types being adapted to cooperate with each other to guide the sub-frame in movement between the rest position and the operating position, the elements of one type being arranged on and fixed directly with respect to the sub-frame, and
  a disc-pressure device for engaging a disc which has been loaded into said turntable and moved into the operating position,
  the elements of the other of said types being fixed on the frame, and
  the drawer comprising an actuating member and the sub-frame comprising a follower member engaging said actuating member at least during a portion of drawer movement in each of said directions.

12. A disc-record player as claimed in claim 11, wherein the elements of the first type are arranged on the frame and the elements of the second type are arranged on the sub-frame.

13. A disc-record player as claimed in claim 11, wherein an elongated opening is formed in the supporting surface of the drawer, and at the location of the elongated opening, the drawer is provided with a panel which extends parallel to the supporting surface and is movably supported in the drawer.

14. A disc-record player comprising
  a device comprising a scanning unit, for inscribing and/or reading an information carrier disc,
  a loading device, for loading an information carrier into the player, comprising a frame; a sub-frame movable in and relative to the frame between a rest position and an operating position; a turntable carried on the sub-frame and having an axis of rotation; a drawer which is movable relative to said frame in an inward direction and an outward direction and which has at least one supporting surface for an information carrier disc; elements of a first type having inclined guide surfaces; and elements of a second type, the elements of the two types being adapted to cooperate with each other to guide the sub-frame in movement between the rest position and the operating position, the elements of one type being arranged on and fixed directly with respect to the sub-frame, and
  a disc-pressure device for engaging a disc which has been loaded into said turntable and moved into the operating position,
  the elements of the other of said types being fixed on the frame, and
  the player further comprising first and second coupling members for coupling the sub-frame to the drawer during a portion of drawer movement in each of said directions, a first of said coupling members including an abutment surface and an opening extending in a direction parallel to the axis of rotation, and a second of said coupling members being a pin extending parallel to said axis of rotation and arranged to engage said abutment surface during inward movement of the drawer and then to enter said opening during further inward movement of the drawer.

15. A disc-record player as claimed in claim 14, wherein one of said coupling members is fixed to the drawer, and the other of said coupling members is fixed to the sub-frame.

16. A disc-record player as claimed in claim 15, wherein the elements of the first type are arranged on the frame and the elements of the second type are arranged on the sub-frame.

17. A disc-record player as claimed in claim 15, wherein an elongated opening is formed in the supporting surface of the drawer, and at the location of the elongated opening, the drawer is provided with a panel which extends parallel to the supporting surface and is movably supported in the drawer.

* * * * *